Jan. 26, 1960  H. HÖLLER ET AL  2,922,641
MACHINE FOR PERIODIC STRIP FEED
Filed Sept. 26, 1956  2 Sheets-Sheet 1
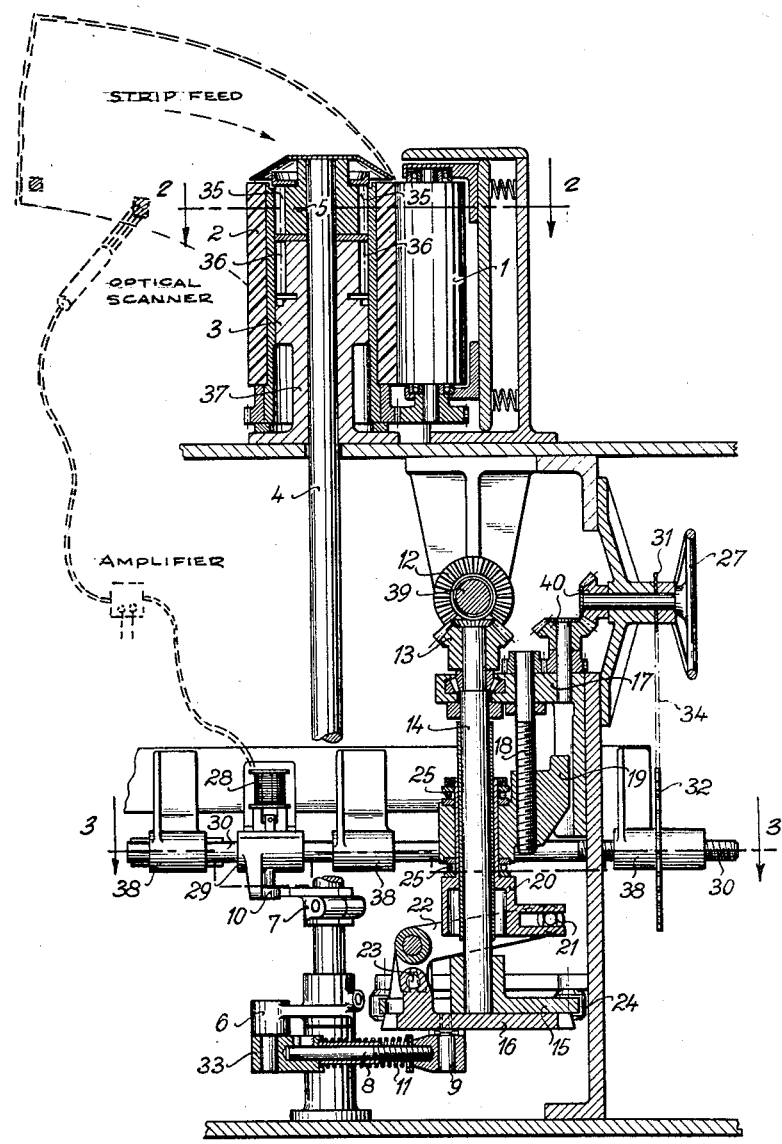
INVENTOR
HANS HOLLER &
JOSEF BREIDENBACH
BY Burgers, Dinklage & Sprung
ATTORNEYS

INVENTORS
HANS HOLLER
JOSEF BREIDENBACH
BY
ATTORNEYS

United States Patent Office 2,922,641
Patented Jan. 26, 1960

2,922,641

MACHINE FOR PERIODIC STRIP FEED

Hans Höller and Josef Breidenbach, Bergisch Gladbach, Germany, assignors to Maschinenfabrik Gebrüder Höller Offene Handelsgesellschaft, Bergisch Gladbach, Germany, a German firm Application September 26, 1956, Serial No. 612,219

Claims priority, application Germany March 31, 1956

12 Claims. (Cl. 271—2.6)

This invention relates to a method for periodic strip feeding on an apparatus for forming flat bags, in particular a machine for forming, filling and closing flat bags, and further a corresponding strip conveyor device, which is used in connection with this method and serves to carry it out.

An object of the device for the strip feed consists of periodically transporting a strip of the usual wrapping materials for example, cellophane, laminated paper, aluminum foil, which has been given impressed or printed marks, hereinafter referred to as "impressed marks" folded longitudinally and sealed perpendicularly to the distance between the impressed marks.

The device according to the invention is characterised in that without changing parts the distance between the impressed marks of the strip of wrapping material to be machined may range between 30 and 150 mm. and that during the run of the device a step-by-step adjustment of the feed is possible. For the method according to the invention in which the device is used, the characteristic feature is the automatic adjustment of the device and the strip conveyor to an accurately predetermined value.

The method according to the invention for a periodic strip feed on a device for forming flat bags, in particular a machine for forming, filling and closing flat bags, in which the strip feed is controlled by optical scanning of impressed marks or the like on the strip of wrapping material, is characterised in that, starting with each new forward stroke the periodic strip feed is effected about a fraction of a millimetre greater than the distance between the impressed marks each movement, and when the impressed marks and the optical scanner coincide, by release of an electrical impulse actuated as a result thereof a single larger stroke shortening of the strip feed of about a millimetre occurs, after which in the course of the next cycle the position of the impressed marks approaches the optical scanner step-by-step until coincidence occurs once more.

In this method there is used a strip conveyor device, which is characterised by a strip conveyor moving only in the direction of the feed, which is driven by a crank drive. The strip conveyor is preferably made free-running with automatic locking during return stroke oscillatory motion of its driving shaft.

The appliance serving to carry out the method according to the invention is primarily characterised by a locking device controlled by the optical impressed marks scanner for the stroke shortening of the conveyor and consequently of the next strip feed movement following coincidence of impressed marks and scanner. This locking device is preferably a stop controlled by the optical scanner. Such an appliance may suitably be a magnet which actuates a stop for a stroke shortening swinging arm adapted to prevent the return stroke oscillatory motion of the crank drive from being transmitted to the strip conveyor means. In this way the whole of this blocking device can be borne for oscillatory movement on a shaft.

A further object of the invention is to equalize the stroke-shortening between the crank drive and the strip conveyor by providing a resilient motion translation member between the two. A particularly suitable method of doing this is to form the connecting rod of the crank drive telescopically, so that during the stroke-shortening it allows an equalizing alteration in length against the pressure of a spring.

The device serving to carry out the method according to the invention is further characterised by an adjustment mechanism for the step-by-step setting of the crank drive oscillation amplitude during the running of the machine. For this purpose a plate can be arranged movably on the crank disc during the rotation of the disc, which carries the crank pin. To adjust the pilot plate during rotation a conjointly rotating lever may suitably be provided, which is borne preferably on the crank disc return side. On the crank disc spindle there is fitted a further conjointly rotating guide head for actuating the swinging lever, whereby the axial shaft of the guide head can be effected by means of a handwheel on an adjustable spindle nut.

For the purpose of obtaining common coincident adjustment of the crank lift pin and the stop there is provided in the embodiment to be described by way of example, a further chain drive or the like between the setting hand wheel and the shaft carrying the stop device.

In the accompanying drawing an embodiment is given by way of example of the device according to the invention, serving to carry out the method of the invention.

Fig. 1 shows a diagrammatic view partly in section of an embodiment of the strip feed device in accordance with the invention;

Figure 2:
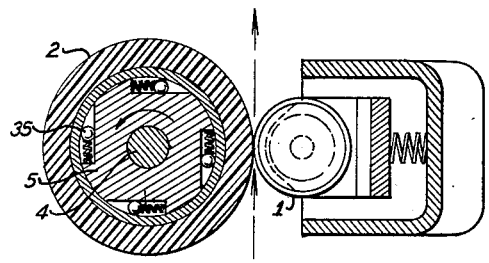
Fig. 2 is a sectional view of the embodiment of Fig. 1 taken along line 2—2 of Fig. 1.

Referring to the drawings and more particularly to Figs. 1 and 2, the strip to be conveyed periodically folded in the longitudinal direction lies between a spring pressure roller 1 and a resiliently covered feed roller 2, which serves as strip conveyor. A bearing 3 houses a shaft 4, which serves as a spindle for the feed roller 2 and is formed at the top end as a return pawl. Above the bearing 3 is a freewheel 5, which serves as a driver and is fixed to the shaft 4. A crank 6, similarly fixed to the shaft 4, serves to set in reciprocating motion members 4 and 5 and therewith the whole of the strip conveyor borne on base 37. The freewheel 5 transfers this motion to the feed roller 2, which is set in stepwise rotation only in the feed direction. Backward motion of the feed roller 2 and consequently of the strip to be transported during the feed pause between two forward movements is prevented by the return pawl. The construction of the freewheel mechanism is known art, in which freewheel rollers are movable in the wedge-shaped spaces 35 and 36.

A crank 7 also fixed to the shaft 4, in conjunction with a spring connecting rod linked to crank 6, which connecting rod is operated by a crank pin 9 in eccentric motion, cultails the return stroke oscillatory motion of the strip conveyor shaft 4 when the movable arm 7 impinges on a blocking prism 10. This curtailment of the return stroke, however, in consequence of a compression spring 11 located around a telescopic rod 8, only occurs during the backward motion of members 4, 5 and 6, when the feed roller 2 is stationary. This stroke-shortening or transport-shortening desired occurs in this motion by the impinging of the crank 7 on the stop 10, which is actuated by a magnet 28, through a rocking arm 29, which is swingable on a shaft 30, which is held in bearings 38 of the machine frame.

Figure 3:
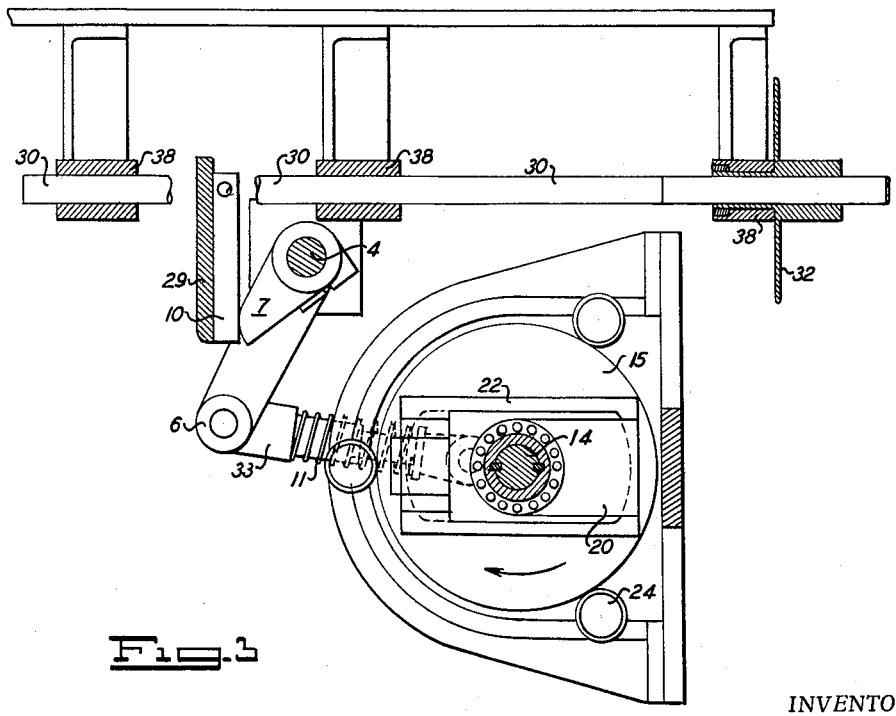
Fig. 3 is a further partial sectional view taken along line 3—3 of Fig. 1.

The eccentric motion of the pin 9 is effected by means of bevel gears 12 and 13, a shaft 14, a disc 15 and a plate 16 arranged for rotational movement by a driving shaft 39. The crank disc 15 acting as a rotor is guided by means of three ball or roller bearings 24. The movement of the pin-plate 16 causes a diminution inwards and a corresponding increase outwards of the stroke executed by the pin 9. A spindle nut 19 is reciprocated along a spindle 18 mounted in member 17, which spindle nut is positioned for vertical travel and held against rotational travel in a guide plate of member 17. This adjusting movement, controlled by a handwheel 27 through bevel gears 40, the spindle 18 and the spindle nut 19, is transmitted by means of two ball or roller bearings 25 to a guide head 20, positioned on the grooved shaft 14 and rotating with it. In the guide prism of the guide head 20 is a pivot 21 fitted with round pins, which transmits the axial movement of the guide head 20 through the lever 22 and a pivot 23 also fitted with round pins, to the plate 16. This mechanism allows the effective stroke amplitude at the crank pin 9 to be adjusted during the running of the machine, and hence during the rotary motion of members 12—14, 20—23 and 15—16 (see Figs. 1 and 3).

The feed device of the invention works as follows: The coarse adjustment is effected with the machine stationary by means of the handwheel 27 according to the impressed marks distance, on a scale. The strip to be machined is fed forward by hand until the impressed marks are coincident with the cutting device. An optical-electrical control belonging to the machine is so set, that an impressed mark stands immediately in front of the light cone of the scanner head. The machine is put into motion and the fine adjustment effected, which makes possible absolutely accurate adjustment to the graduation produced by the impressing machine, likewise by means of the handwheel 27. The coarse adjustment scale is so calibrated in fitting that the movement of the strip actually effected by the appliance is always some tenths of a millimetre greater than the impressed marks distance. The impressed marks on the strip now approach in the course of the next cycle of operations by degrees more and more closely to the cone of light of the scanner, the more slowly the more accurately the handwheel 27 is set. When an impressed mark reaches the cone of light of the scanner head, an electrical impulse is released, which actuates the lifting magnet 28. The stop 10 connected to the magnet is thereby lifted and arrives in the path of movement of the crank 7, which at the point of contact is preferably provided with a curve. By this means the rotary movement of the shaft 4 and the feed roller 2 is unfinished, stopped and thereby a single stroke-shortening is obtained, which acts through the shaft 4, the freewheel 5 and the feed roller 2 on the strip to be machined. As a result of this stroke shortening, the next impressed control mark of the strip remains a fraction of a millimetre from the cone of light of the scanner head, gradually to approach it again as described above.

The stop 10 is borne in the guide piece 29, which is swingably fixed on the screwed spindle 30. The screwed spindle 30 is axially slidably in the bearings 38 and has on its screwed end a chain wheel 32 which is connected via a chain 34 and the chain wheel 31 with the handwheel 27. A rotation of the handwheel 27 effects a rotation of the chain wheel 31, and an axial movement of the spindle 30 and stop 10, whereby a variation of the degree of the lift shortening is obtainable. The result of this connection is that, as well as adjusting to the distance of the impressed marks when setting the machine, and also in re-setting the whole device for a different size of bag, the single lift-shortening or stroke-shortening always has as a consequence the same small amount remaining of the feed movement.

While in the foregoing there has been described a specific embodiment of the invention, it will be understood by those skilled in the art that many modifications may be made without departing from the scope of the invention.

We claim:

1. In a device for forming, filling and closing flat bags having means for periodically feeding a strip of wrapping material from which the flat bags are to be formed including a freewheel feed roller, a roller drive shaft connected to said roller for actuation thereof in only one direction, an oscillating drive means for said roller drive shaft which is a stroke type drive means capable of translating rotary motion into oscillatory motion of said drive shaft, and optical scanning means for scanning impressed marks on the strip, the improvement which comprises automatic stop means for locking said freewheel feed roller during the return stroke oscillation of said roller drive shaft, and means actuated by said optical scanning means upon coincidence of said impressed marks and said scanning means for shortening the return stroke oscillation of said roller drive shaft while said freewheel feed roller is stationary.

2. Improvement according to claim 1 wherein said means for shortening the return stroke oscillation of said roller drive shaft includes a solenoid actuated by said scanning means and a blocking prism actuated by said solenoid for limiting the return stroke oscillatory motion of said roller drive shaft.

3. Improvement according to claim 2 wherein said drive shaft is provided with a stop arm mounted for movement therewith having an advance cam positioned for contact with said blocking prism for shortening the return stroke oscillation of said roller drive shaft.

4. Improvement according to claim 3 wherein said blocking prism is positioned on a support shaft, capable of axial travel toward and away from the center of oscillation of said roller drive shaft, for axial movement therewith.

5. Improvement according to claim 3 wherein said oscillating drive means includes elastic motion translation means for compensating the shortening of the return stroke of said oscillating drive means.

6. Improvement according to claim 5 including a telescopically arranged connecting rod for said oscillating drive means for compensating the shortening of the return stroke against the pressure of a spring by alteration of the length of said spring.

7. Improvement according to claim 1 including adjusting means for adjustment of the amount of return stroke of said oscillating drive means.

8. Improvement according to claim 7 wherein said oscillating drive means includes a crank disc rotatable on a crank shaft and said adjusting means includes a plate carrying a crank pin, said plate being mounted for rotation with said crank disc, and a swinging lever pivotally positioned on said crank disc and mounted for rotation therewith, said lever being arranged for radial adjustment of said pin with respect to said crank drive shaft by movement toward and away from the center of rotation of said crank drive shaft.

9. Improvement according to claim 8 including a rotatable crank shaft for driving said crank disc and a guide head positioned for rotation on said crank shaft and capable of axial movement therealong for operating said swinging lever.

10. Improvement according to claim 9 including a manually adjustable spindle nut means including a nut positioned for reciprocation on said crank shaft for control of the axial movement of said guide head.

11. Improvement according to claim 10 wherein said means for shortening the return stroke oscillation of said roller drive shaft includes a blocking prism capable of actuation to limit the return stroke oscillatory motion of said roller drive shaft by engaging a stop means on said roller drive shaft, said blocking prism being positioned on a support shaft which is capable of axial travel toward and away from the center of oscillation of said roller drive shaft for axial movement therewith and wherein said adjusting means includes chain drive means connecting said adjustable spindle nut means with said support shaft for adjustment of the positioning of said blocking prism with respect to said center of oscillation of said roller drive shaft.

12. Improvement according to claim 4 having adjustment means for adjustment of the amount of the return stroke oscillation of said roller drive shaft including a crank disc, a rotatable crank shaft for driving said crank disc, an adjustable plate carrying a crank pin, said plate being mounted for rotation with said crank disc and for adjustable travel along a portion of said disc, a swinging lever positioned on said crank disc for adjustment of said plate, a guide head connected to said swinging lever, said guide head being positioned for rotation on said crank shaft and being capable of axial movement therealong, a manually adjustable spindle nut means including a nut positioned for reciprocation on said crank shaft for control of the axial movement of said guide head and chain drive means connecting said adjustable spindle nut means with said support shaft for position adjustment of said blocking prism with respect to the center of oscillation of said roller drive shaft.

References Cited in the file of this patent

UNITED STATES PATENTS 2,738,187     Johnson _____ Mar. 13, 1956

UNITED STATES PATENT OFFICE

CERTIFICATE OF CORRECTION

Patent No. 2,922,641 January 26, 1960

Hans Höller et al.

It is hereby certified that error appears in the above numbered patent requiring correction and that the said Letters Patent should read as corrected below.

In the drawings, Sheet 1, Fig. 1, the arrow under the words "strip feed" should point in the opposite direction instead of as in the present Fig. 1.

Signed and sealed this 9th day of August 1960.

(SEAL)
Attest:

KARL H. AXLINE
Attesting Officer

ROBERT C. WATSON
Commissioner of Patents